(12) United States Patent
Fukudome

(10) Patent No.: US 9,052,858 B2
(45) Date of Patent: Jun. 9, 2015

(54) PRINTING SYSTEM, PRINTING SERVER AND INFORMATION PROCESSING DEVICE

(71) Applicant: KONICA MINOLTA, INC., Tokyo (JP)

(72) Inventor: Kenji Fukudome, Kawabe-gun (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/335,128

(22) Filed: Jul. 18, 2014

(65) Prior Publication Data
US 2015/0029548 A1     Jan. 29, 2015

(30) Foreign Application Priority Data
Jul. 26, 2013    (JP) .................................. 2013-155261

(51) Int. Cl.
    *G06F 3/12*           (2006.01)

(52) U.S. Cl.
CPC ............ *G06F 3/1255* (2013.01); *G06F 3/1285* (2013.01); *G06F 3/1268* (2013.01); *G06F 3/1203* (2013.01)

(58) Field of Classification Search
None
See application file for complete search history.

(56) References Cited

U.S. PATENT DOCUMENTS

| | | | | |
|---|---|---|---|---|
| 2008/0151293 A1* | 6/2008 | Narukawa | ..................... | 358/1.15 |
| 2013/0135673 A1* | 5/2013 | Murakawa | ..................... | 358/1.15 |
| 2014/0092420 A1* | 4/2014 | Fukudome | ..................... | 358/1.14 |

FOREIGN PATENT DOCUMENTS

| | | | |
|---|---|---|---|
| JP | 2006-338237 A | 12/2006 |
| JP | 2009-140429 A | 6/2009 |
| JP | 2013-114288 A | 6/2013 |

OTHER PUBLICATIONS

Office Action issued on Apr. 14, 2015, by the Japanese Patent Office in corresponding Japanese Patent Application No. 2013-155261, and an English Translation of the Office Action. (9 pages).

* cited by examiner

*Primary Examiner* — Marcus T Riley
(74) *Attorney, Agent, or Firm* — Buchanan Ingersoll & Rooney PC

(57) ABSTRACT

A information processing device includes: a job generating part for generating the print job in response to a user instruction; and a job transmitting part for separating job information and header information showing settings of the print job and sending the separated header information to a print server. The print server includes: an initial determination part for making an initial determination to determine a printing rule applied to the print job based on the header information and sending a result of the initial determination to the information processing device; and a job controlling part for continuing a process on the print job in response to receiving a continue instruction from the information processing device, and suspending the process on the print job in response to receiving a suspend instruction from said information processing device.

19 Claims, 12 Drawing Sheets

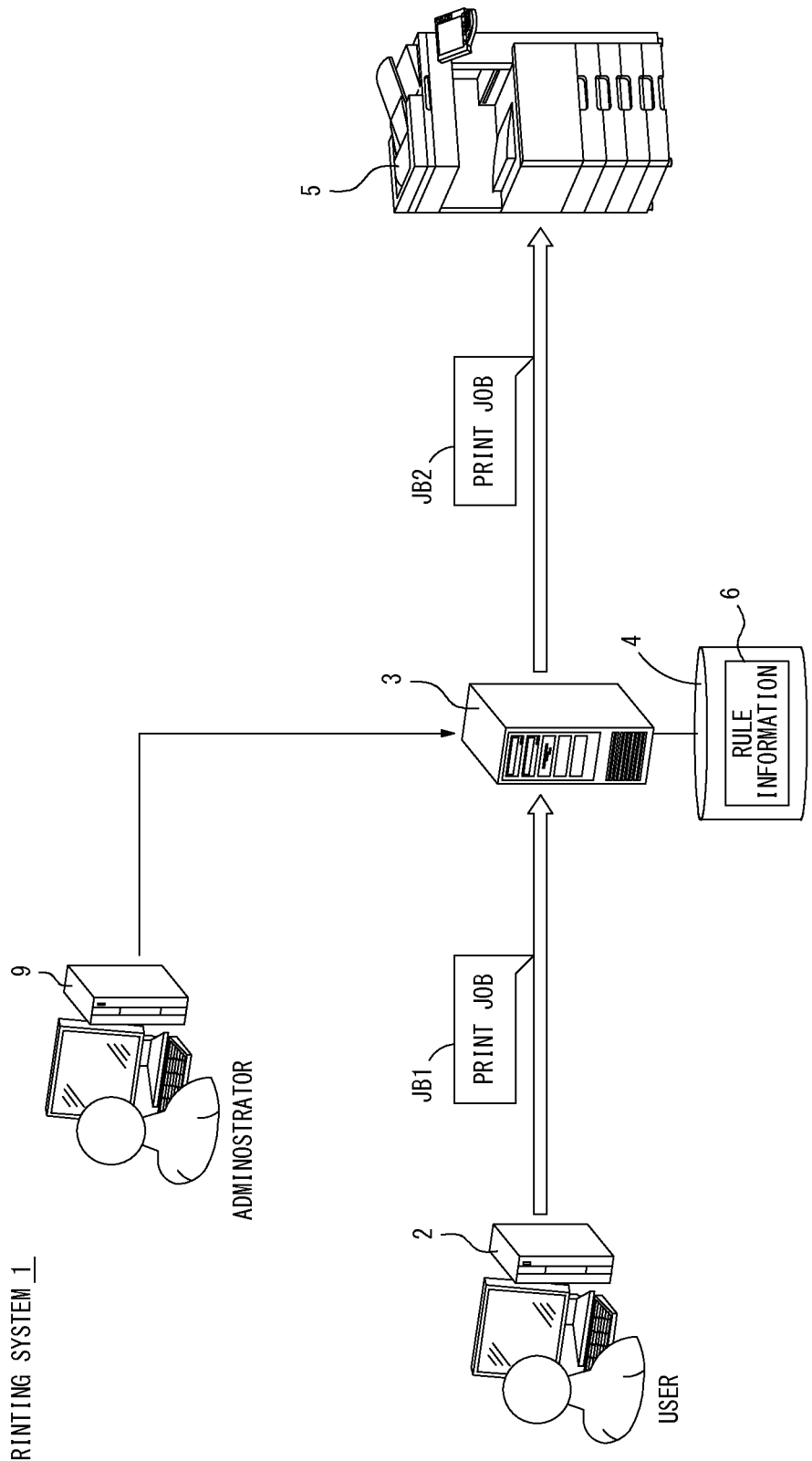

FIG. 2

RULE INFORMATION 6

| PRINTING RULE 6a | TYPE 6b | PRINTING RULE APPLYING JOB 6c | PRINTING RULE APPLICATION PROCESS 6d | EXEMPTION FROM APPLICATION OPTION 6e |
|---|---|---|---|---|
| A | COST SAVING RULE | USER X'S PRINT JOB | PRINT TWO PAGES ON A SINGLE SHEET | ALLOW |
| B | OPERATIONAL EFFICIENCY RULE | PRINT JOB CONTAINING MORE THAN 100 PAGES | PRINT BY HIGH-SPEED OUTPUT DEVICE | ALLOW |
| C | SECURITY ENHANCING RULE | PRINT JOB CONTAINING CHARACTER STRING "IMPORTANT" IN DOCUMENT TO PRINT | PRINT AFTER ADDING WATERMARK "CONFIDENTIAL" | BANNED |
| D | SECURITY ENHANCING RULE | ALL PRINT JOBS | PRINT WITH USER NAME ATTACHED TO PRINTED OUTPUT | BANNED |
| E | COST SAVING RULE | PRINT JOB GENERATED BY TEXT OR EMAIL APPLICATION | PRINT IN BLACK AND WHITE | ALLOW |

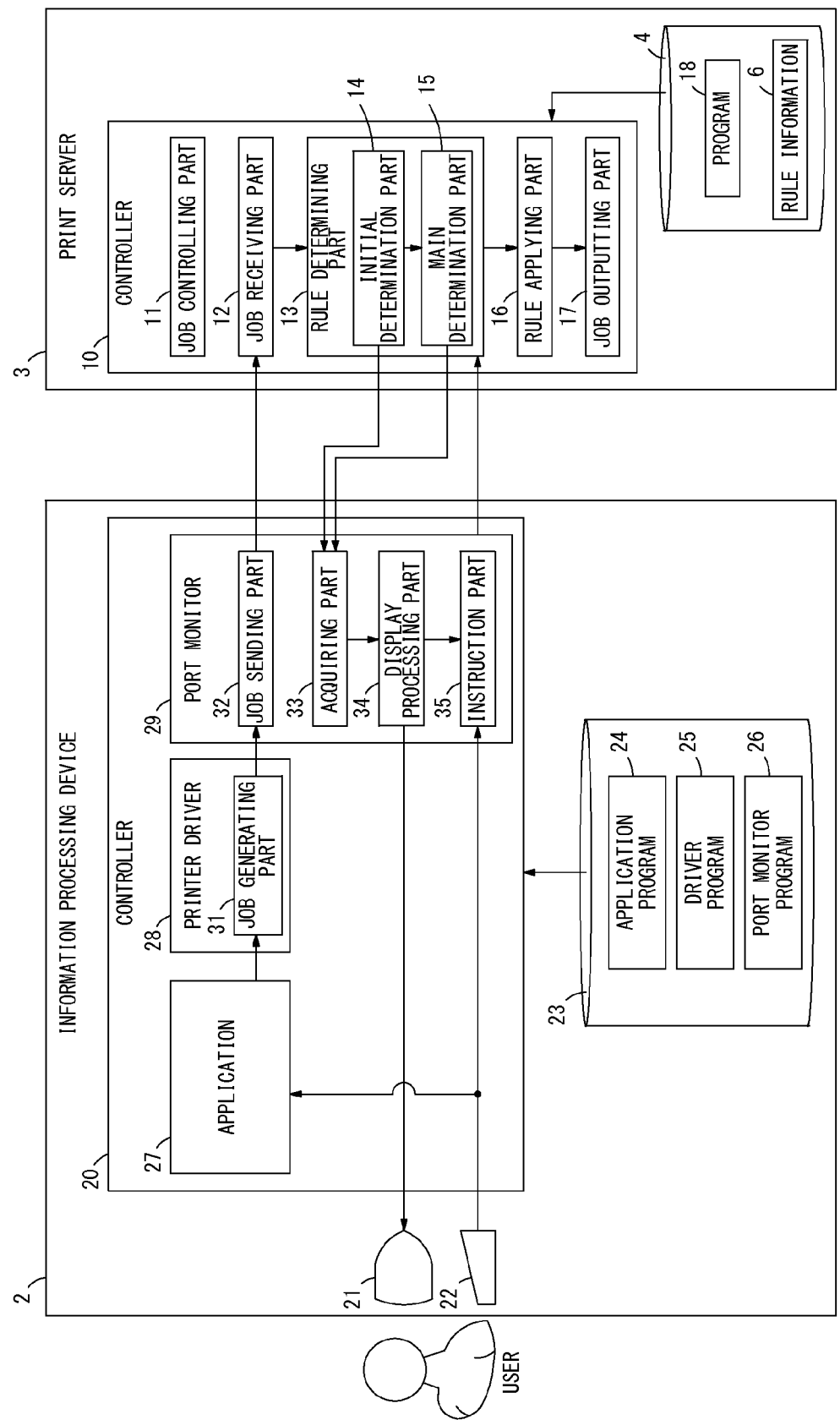

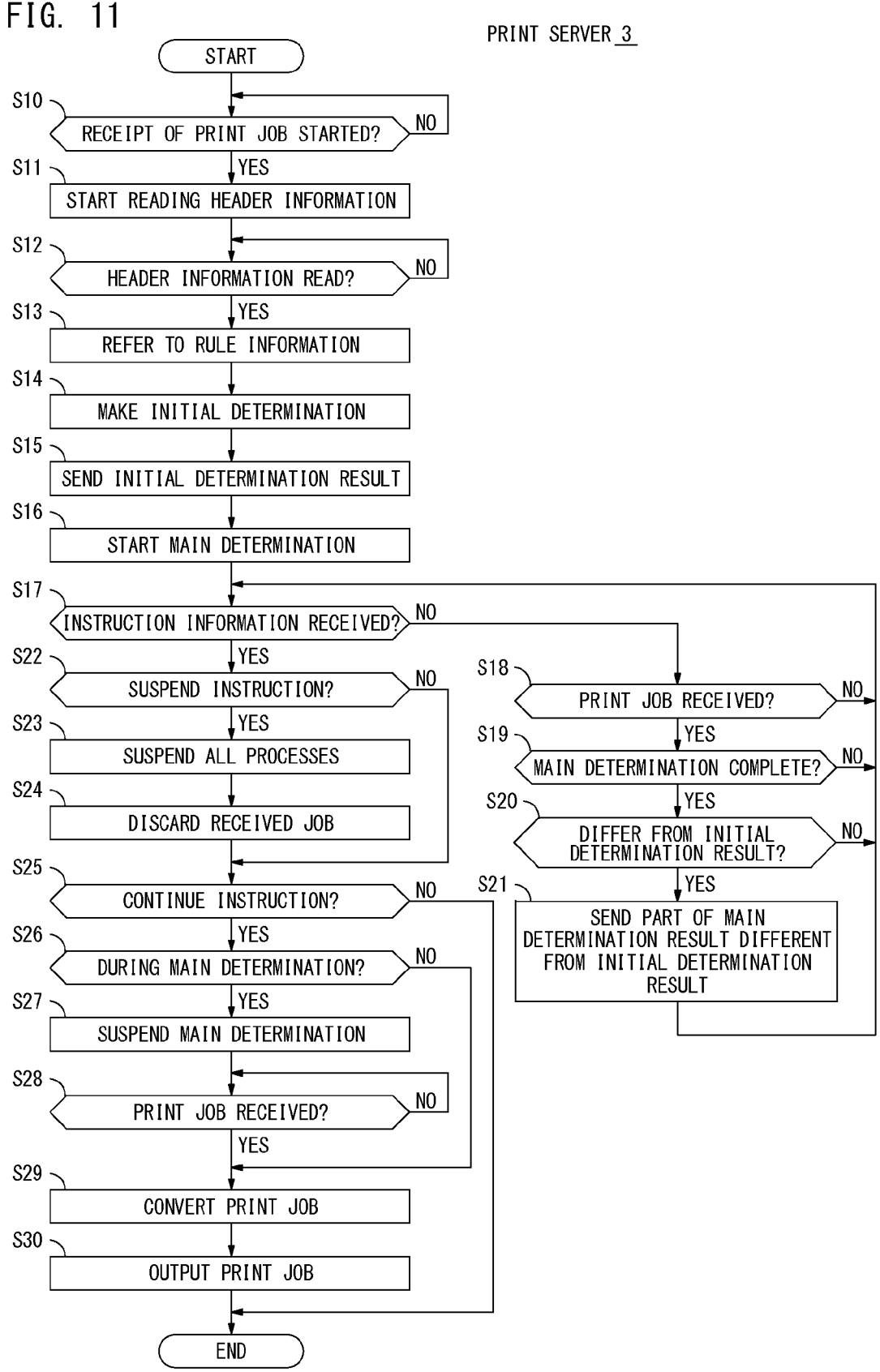

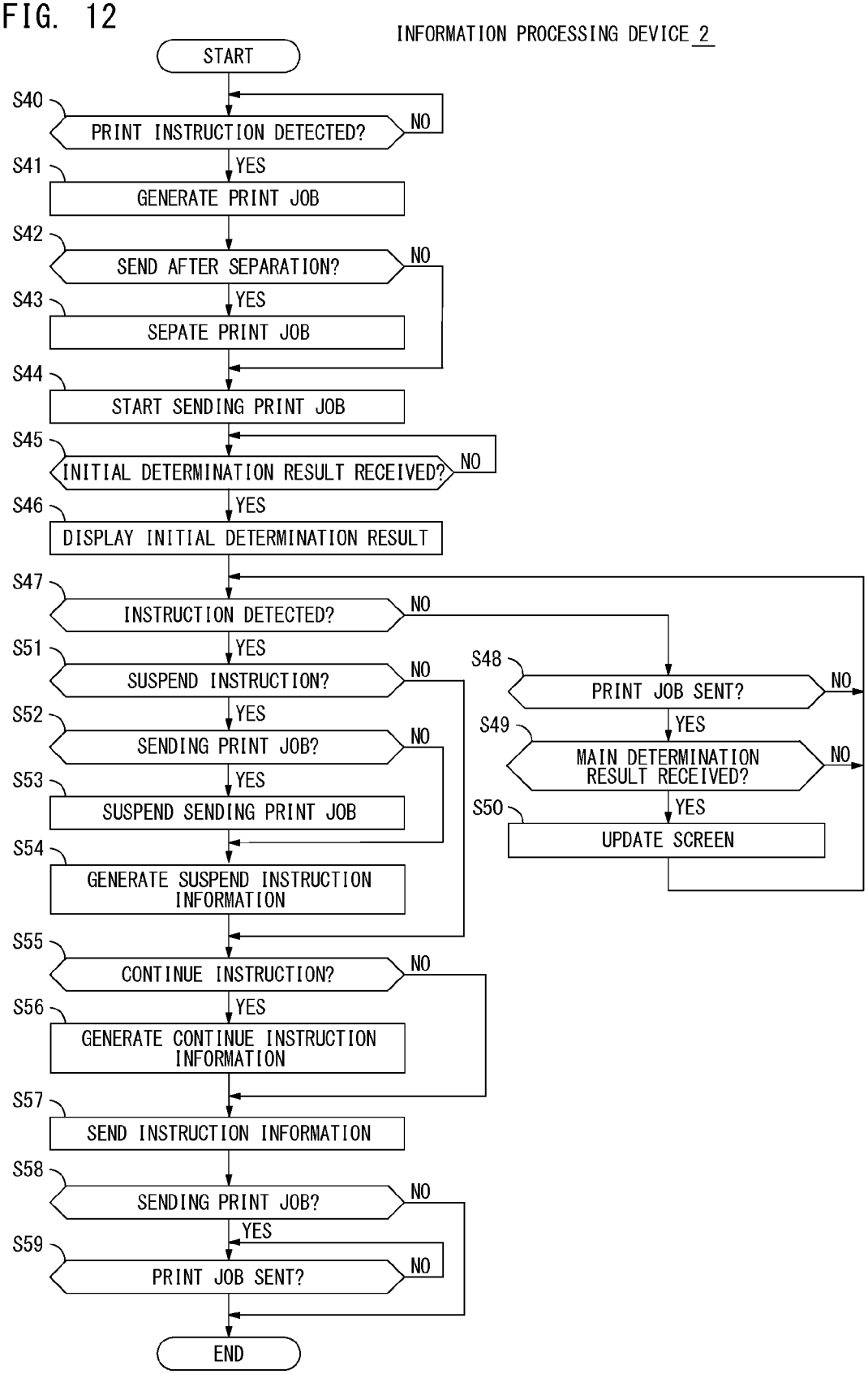

PRINTING SYSTEM, PRINTING SERVER AND INFORMATION PROCESSING DEVICE

This application is based on the application No. 2013-155261 filed in Japan, the contents of which are hereby incorporated by reference.

BACKGROUND OF THE INVENTION

1. Field of the Invention

The present invention relates to a printing system, a print server and an information processing device. The present invention more specifically relates to a technique of controlling printing process by applying a printing rule to a print job on the print server.

2. Description of the Background Art

For producing a printed output such as a document, a rule which is registered in advance is conventionally applied based on information included in a print job and the printed output is produced in accordance with a result of application of the printing rule. The printing rule defining print settings for each print purpose is registered in advance with a printer. This known technique is introduced for example in Japanese Patent Application Laid-Open No. JP 2006-338237 A. According to this known technique, in response to receiving the print job, the printer specifies the print purpose based on template information included in the received print job. The printer applies the printing rule corresponding to the specified print purpose and configures the print settings such as printing double sided and/or printing multiple pages on a single sheet, thereby producing the printed output. The conventional printing rule applied at printing process is aimed to reduce printing costs by saving the number of the produced printed outputs.

When producing the printed output by applying the printing rule to the print job, the printed output is sometimes produced in a way a user does not intend. It is assumed, for instance, that the conventional printing rule is applied to the print job as described above to automatically configure settings to print double sided and two pages on a single sheet. In this case, even though the user intends to have the printed output with one page of the document to print printed on one side of the whole sheet, the document is forcibly printed double sided and two pages on the single sheet. In such a case, the printed output is not produced in a way the user intends. Therefore, the printed output may be wasted, and a purpose of the printing rule to cut printing costs cannot be achieved.

In order to solve the above-described problems, when receiving the print job, for example, the printer should make the user check by showing the result of applying the printing rule before starting a process proceeded by applying the printing rule to the print job. In this case, the user is allowed to determine whether or not to continue printing after checking the result of applying the printing rule, so this may prevent the printed output from being wasted.

In these days, the printing rules applied to the print jobs have likely to become diversified. It is assumed, for example, the printing rule to print with a high-speed output device if the printed output produced with the print job exceeds a predetermined number of pages may be registered. When such a printing rule is registered, the number of pages of the printed output to be produced needs to be detected by analyzing whole data included in the received print job before determining whether or not to apply the printing rule to the print job.

When the print job has a large size of data, it may require a long time to complete receiving the job. In this case, it also require a long time to analyze the data included in the print job. This may require an extremely long time to show the user who sent the print job the result of applying the printing rule. Therefore, this may make the user wait for the extremely long time to see the result of applying the printing rule. Some users may move to the installation site of the printer and wait to have the printed output after sending the print job without noticing the displayed result of application of the printing rule being displayed because a screen does not change even at a later time. In such a case, even if the user waits for a long time in front of the printer, printing does not start, so the user wastes a time and energy.

SUMMARY OF THE INVENTION

The present invention is intended to solve the above problems. Thus, the present invention is intended to provide a printing system, a print server and an information processing device capable of eliminating wasting time by rapidly showing a result of applying a printing rule to a user who has given a print job when a printed output is produced by applying the printing rule.

First, the present invention is directed to a printing system comprises an information processing device and a print server. A printing rule registered in advance with said print server is applied to a print job sent from said information processing device and a process defined in the printing rule is performed so that printing process being controlled.

According to an aspect of the printing system, said information processing device includes: a job generating part for generating the print job in response to a user instruction; and a job transmitting part for separating job information and header information showing settings of the print job generated by said job generating part and sending the separated header information to said print server. The print server includes: an initial determination part for making an initial determination to determine the printing rule applied to the print job based on the header information in response to receiving the header information from said information processing device and sending a result of the initial determination to said information processing device; and a job controlling part for continuing a process on the print job in response to receiving a continue instruction from said information processing device, and suspending the process on the print job in response to receiving a suspend instruction from said information processing device after the result of the initial determination is sent to said information processing device by said initial determination part.

Second, the present invention is directed to a printing system comprises an information processing device and a print server. A printing rule registered in advance with said print server is applied to a print job sent from said information processing device and a process defined in the printing rule is performed so that printing process being controlled.

According to one aspect of the printing system, the information processing device includes: a job generating part for generating the print job containing header information and job information in response to a user instruction; and a job transmitting part for sending the print job generated by said job generating part to said print server. The print server includes: an initial determination part for extracting the header information showing settings of the print job in the print job received from said information processing device to make an initial determination to determine the printing rule applied to the print job based on the header information, and sending a result of the initial determination to said information processing device; and a job controlling part for continuing a process on the print job in response to receiving a continue instruction from said information processing device, and suspending the process on the print job in response to receiving a suspend instruction from said information processing device after the result of the initial determination is sent to said information processing device by said initial determination part.

Third, the present invention is directed to a print server capable of controlling printing process by applying a printing rule to a print job containing header information and job information and performing process defined in the printing rule.

According to one aspect of the print server, the print server, comprises: a receiving part for receiving the print job; an initial determination part for making an initial determination to determine the printing rule applied to the print job based on the header information showing settings of the print job received by said receiving part and sending a result of the initial determination to a sender of the print job; and a job controlling part for continuing a process on the print job in response to receiving a continue instruction from said sender, and suspending the process on the print job in response to receiving a suspend instruction from said sender after the result of the initial determination is sent to said sender by said initial determination part.

Fourth, the present invention is directed to an information processing device sending a print job to a print server capable of controlling printing process by applying a printing rule to the print job.

According to one aspect of the information processing device, the information processing device, comprises: a job generating part for generating the print job containing header information and job information in response to a user instruction; a job transmission part for sending the print job generated by said job generating part to said print server; an acquiring part for acquiring from said print server a result of an initial determination through which the printing rule applied to the print job being determined after the process to send the print job is started by said job transmission part; a display part on which the result of the initial determination acquired by said acquiring part is displayed; and an instruction part for sending a continue or suspend instruction in response to the result of the initial determination displayed on said display part to said print server based on the user instruction.

BRIEF DESCRIPTION OF THE DRAWINGS

FIG. 1 shows an exemplary configuration of a printing system;

FIG. 2 is an example of rule information;

FIG. 3 is a block diagram showing an exemplary hardware configuration and functional configuration of the printing system;

FIG. 11 is a flow diagram explaining an exemplary sequential procedure of the process performed on the print server; and FIG. 12 is a flow diagram explaining an exemplary sequential procedure of the process performed on the information processing device.

DESCRIPTION OF THE PRESENT PREFERRED EMBODIMENTS

Figure 4:
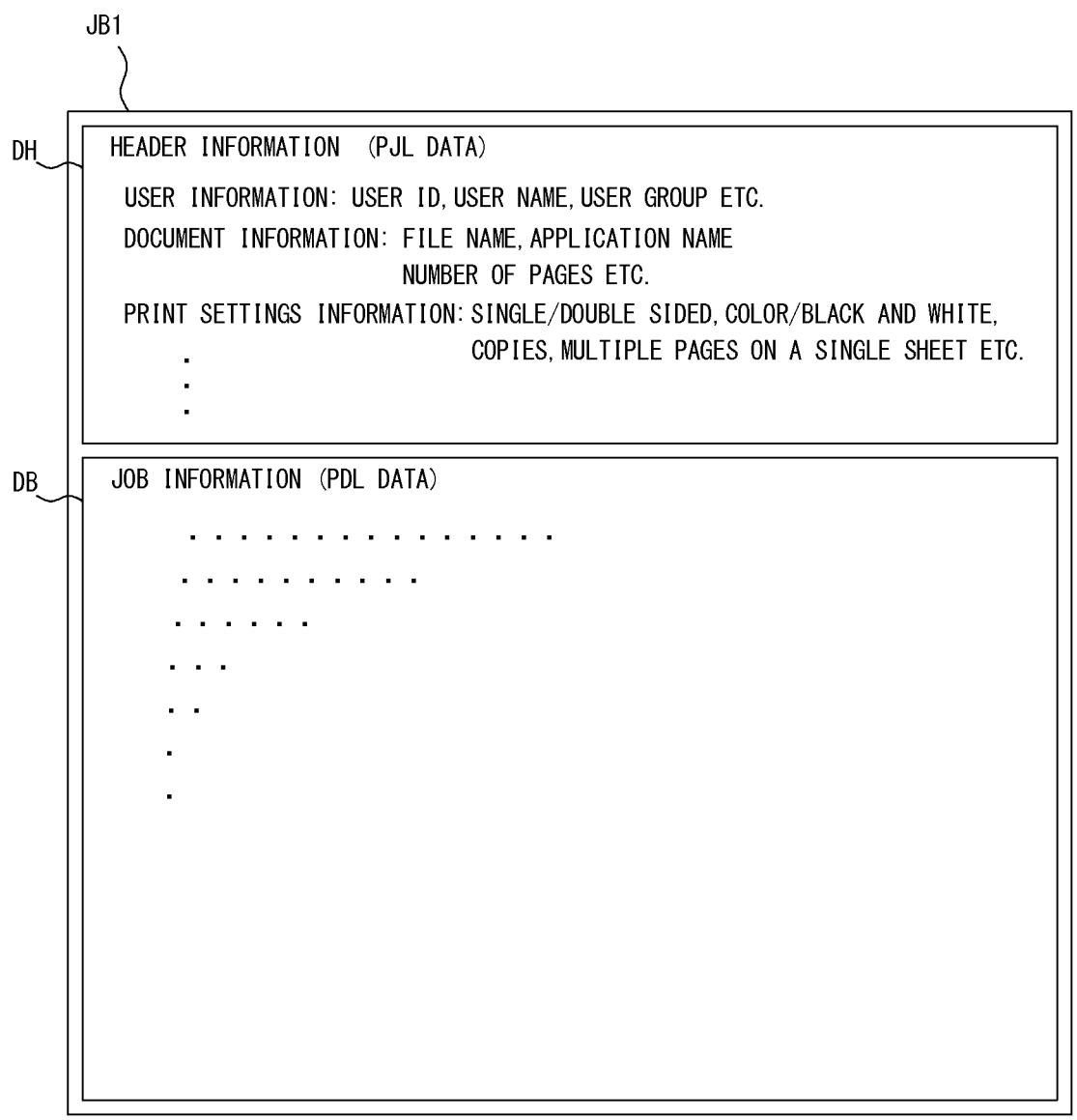
FIG. 4 shows an example of a data structure of a print job generated by a job generating part.

A Preferred embodiment of the present invention is described in detail below with reference to figures. In the description given below, those elements which are shared in common among figures are represented by the same reference numerals, and these elements are not discussed repeatedly for the same description.

FIG. 1 shows an exemplary configuration of a printing system 1 of the first present preferred embodiment of the present invention. The printing system 1 is a network system comprising more than one information processing device 2 and 9, a print server 3 and an image forming device 5. This network system is established in an office, for instance, to perform printing process. On the printing system 1, each of the information processing devices 2 and 9, the print server 3 and the image forming device 5 is capable of establishing wired or radio data communication over a network such as LAN (Local Area Network).

The information processing devices 2 and 9 are formed from general computers (PC), for example. With the information processing device 2 of the information processing devices, the user edits and creates a document to print, for instance, and outputs a print job JB1 to the print server 3. The information processing device 9 is used by an administrator to register various types of information with the print server 3.

The image forming device 5 is formed from a device such as one of MFPs (Multifunction Peripherals). The image forming device 5 includes print function to produce a printed output by forming images on a printing sheet, for instance, based on the print job input over the network. The image forming device 5 is equipped with multiple colors of toners or inks. When the input print job specifies printing in color, the image forming device 5 forms images with multiple colors to print in color. When the input print job specifies printing in black and white, the image forming device 5 forms images with only black to print in black and white. The image forming device 5 is also capable of automatically printing multiple pages of a document on a single sheet or printing double sided, for example, based on the print settings of the input print job. Furthermore, the image forming device 5 is capable of adding a certain image (such as watermarks or character strings) for printing based on the print settings.

Although in the example of FIG. 1, only one image forming device 5 is installed, the number of the image forming device 5 is not always only one. To be more specific, more than one image forming device 5 may be installed on the printing system 1. In such a case, different type of the image forming device 5 may be included in the more than one image forming device 5. The more than one image forming device 5 may include a regular output device that is capable of printing at a normal rate and a high-speed output device that is capable of printing faster than the normal rate.

The print server 3 centrally controls the print job JB1 output from the information processing device 2 of the printing system 1 and outputs to the image forming device 5 after applying the printing rule to the print job JB1, thereby controlling printing to meet conditions for output defined in advance in the printing rule. The conditions for output defined in the printing rule include a variety of conditions. The condition to change the print settings of the print job JB1 to a predetermined state and print or to designate certain image forming device 5 and print may be included when there is more than one image forming device 5, for example. To be more specific, in response to receiving the print job JB1 from the information processing device 2, the print server 3 determines the printing rule to apply to the print job JB1. The print server 3, based on the determination result, applies the printing rule to the print job JB1 and changes the print settings of the print job JB1 or the device to which the print job JB1 is output. More specifically, the print server 3 automatically converts the input print job JB1 to a print job JB2 to which the printing rule is applied. The print server 3 then outputs the print job JB2 to which the printing rule is applied to the image forming device 5.

The print server 3 includes a nonvolatile storage device 4 formed from a device such as a hard disk device. The storage device 4 is capable of temporarily storing therein the print job JB1 received by the print server 3. Also, a variety of information registered in advance by the administrator is stored in the storage device 4. The storage device 4 stores therein rule information 6 as illustrated in FIG. 1, for instance. The administrator uses the information processing device 9 to register in advance the rule information 6 with the print server 3.

A variety of printing rules are registered as the rule information 6. FIG. 2 is an example of the rule information 6. More than one printing rule may be registered as the rule information 6 as shown in FIG. 2. The rule information 6 contains information 6a to 6e as items recorded for each printing rule. The items are the printing rule 6a as which information such as a name to identify the printing rule is registered, the type 6b as which a type of the printing rule is recorded, the printing rule applying job 6c as which the job to which the printing rule is applied is recorded, the printing rule application process 6d as which process proceeded in accompanied with application of the printing rule is recorded and the exemption from application option 6e as which whether or not the option to exempt from application of the printing rule is available is recorded.

The printing rule A, for instance, relating to cost saving defines the process to change the print settings of the print job JB1 to print two pages on a single sheet when a user X's print job JB1 is received. The setting to print two pages on a single sheet specifies to automatically layout two pages of the document on a single sheet. The printing rule B relating to operational efficiency defines the process to change a device to which the print job JB1 is sent to the high-speed output device when the received print job JB1 contains more than 100 pages. The printing rule C relating to enhanced security defines the process to change the print settings of the print job JB1 to print after adding a watermark "confidential" when the print job JB1 containing a character string "important" in data such as a file name of a document to print. The printing rule D relating to enhanced security defines the process to change the print settings of the print job JB1 to add a user name and produce the printed output whatever print jobs JB1 are received. The printing rule E relating to cost saving defines the process to change the print settings of the print job JB1 to print in black and white when the print job JB1 generated by a text application or an email application is received.

By referring to FIG. 2, the user is allowed to select the exemption from application for the printing rules A, B and E, and is not allowed to select the exemption from application for the printing rules C and D. To be more specific, when the exemption from application option 6e of the rule information 6 shows "allow," the user is allowed to select the exemption from application of the printing rule. When the exemption from application option 6e of the printing rule shows "banned," the user is not allowed to select the exemption from application of the printing rule. According to the present preferred embodiment, the printing rules C and D relate to enhanced security, and if the user selects the exemption from application of the printing rules C and D, it compromises the security. In order to prevent this, the exemption from application of the printing rules C and D is set as "banned."

Information registered in advance by an administrator is recorded as each item 6a to 6e registered for each printing rule with the rule information 6 of FIG. 2. For the item of the exemption from application option 6e, the print server 3 may automatically configure the settings to "banned" or "allow" depending on the type of the printing rule set as the item of the type 6b. When, for example, the printing rule registered by the administrator is the rule relating to enhanced security, the item of the exemption from application option 6e corresponding to the rule may be configured as "banned," and the rest of the rules may be configured as "allow."

In the present preferred embodiment, the part of the printing rules registered in the rule information 6 as described above allow the user to select the exemption from application of the printing rule. However, the administrator may configure in advance not to allow the user to select the exemption from application of any printing rule.

In response to receiving the print job JB1 over the network, the print server 3 makes determination to determine the printing rule to apply to the print job JB1 based on the above-described rule information 6. Through the determination, multiple printing rules may be determined as the printing rule should be applied to a print job JB1. The printing rule is automatically applied to the print job JB1 on the print server 3, so that some printed outputs are produced in the way the user does not intend. In order to prevent that, the printing system 1 of the present preferred embodiment is configured to show the result of applying the printing rule in advance to the user and allow the user to check before starting the printing process. The aforementioned printing system 1 is described in detail next.

FIG. 3 is a block diagram showing an exemplary hardware configuration and functional configuration of the printing system 1 of the present preferred embodiment. FIG. 3 does not show the image forming device 5 and the information processing device 9 used by the administrator.

As illustrated in FIG. 3, the information processing device 2 includes a controller 20, a display unit 21, a manipulation input unit 22 and a storage unit 23. The controller 20 includes a CPU (Central Processing Unit) and a memory. The display unit 21 is formed from a device such as a liquid crystal display, for example, and the manipulation input unit 22 is formed with parts such as a keyboard and/or mouse, for example. The storage unit 23 is formed from a device such as a hard disk device. The storage unit 23 stores therein a variety of programs installed in advance, and the programs are executed by the CPU of the controller 20. According to the present preferred embodiment, as illustrated in FIG. 3, application programs 24 for creation, edition or browse of a document to print, a driver program 25 for generating the print job and a port monitor program 26 attached to the driver program 25 and works together with the driver program 25 in an integrated manner are installed in advance on the storage unit 23. According to the present preferred embodiment, the port monitor program 26 is installed separately from the driver program 25. By additionally installing the port monitor program 26 on the information processing device 2 on which only the driver program 25 is installed, the functions included in a port monitor 29 described later may be added to the information processing device 2. The program structure is not limited to that explained above. The port monitor program 26 and the driver program 25 may be configured as an integrated program.

The CPU of the controller 20 executes the programs 24, 25 and 26, and the controller 20 serves as an application 27, a print driver 28 and the port monitor 29. The application 27 is brought into operation in response to startup of the application program 24 to perform process such as creation, edition or browse of data such as a document to print in response to the user instruction. The print driver 28 is brought into operation by the driver program 25 which is run after the user instruction is detected, for example. The print driver 28 includes a job generating part 31. The job generating part 31 generates the print job JB1 based on the document to print specified by the user and outputs the generated print job JB1 to the port monitor 29. The port monitor 29 is brought into operation by the port monitor program 26 which is run at the same time as the driver program 25. The port monitor 29 includes a job transmitting part 32, an acquiring part 33, a display processing part 34 and an instruction part 35. The job transmitting part 32 sends the print job JB1 generated by the job generating part 31 to the print server 3. The acquiring part 33 acquires information as to determination showing a result of the determination of applying the printing rule by the print server 3 after the job transmitting part 21 starts a process to send the print job JB1. The display processing part 34 displays the information such as the result of determination of the printing rule applied in printing process of the document to print which is specified by the user to print on the display unit 21. The instruction part 35 sends a continue instruction specifying continuation of the process on the print job JB1 or a suspend instruction specifying suspension of the process on the print job JB1 to the print server 3 in response to the user instruction given as the information such as the result of determination of the printing rule is displayed on the display unit 21.

FIG. 4 shows an example of a data structure of the print job JB1 generated by the job generating part 31. As illustrated in FIG. 4, the print job JB1 generated by the job generating part 31 contains header information DH and job information DB. The header information DH is job adjunct information written in a language such as PJL (Print Job Language) data, for instance. The job information DB is for drawing information written in a language such as PDL (Page Description Language) data, for instance.

The header information DH contains a variety of information to make an initial determination to determine the printing rule which should be applied to the print job JB1. The header information DH is information containing user information, document information and/or print settings information, for example. The user information is about the user who gives the print job JB1, and contains information for identifying the user like the user ID, the user name or a group to which the user belongs, for instance. The document information is about the document to print, and contains information like a file name of the document to print, a name of the application by which the document to print is generated or the number of total pages contained in the document to print, for example. The print settings information is about the print settings configured by the user, and contains information relating to settings for printing single/double sided, printing in color/black and white, the number of copies to be printed, and printing multiple pages on a shingle sheet like two pages on a single sheet, for example. The aforementioned various types of information are written between start information and end information, for instance, of the header information DH. For sending the header information DH to the print server 3, the various types of information is sent one after the other from the start information and the end information is sent at last.

The job information DB is body information of the job itself used for drawing at image formation by the image forming device 5. The job information DB contains image information of each page specified by the user to print. The job information DB written in PDL data, for instance, contains bitmap image information of each page specified as the data to print. The job information DB is not always written in PDL data. The job information DB may contain the image information written in vector data such as post script, for instance. As the job information DB contains the image information for drawing, the volume of information is generally much larger than the header information DH.

Figure 5A:
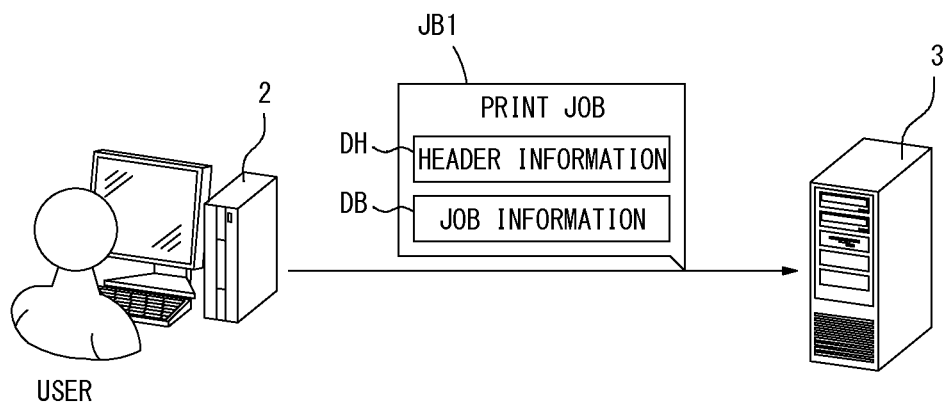
FIGS. 5A and 5B show two ways of sending the print job by an information processing device.
Figure 5B:
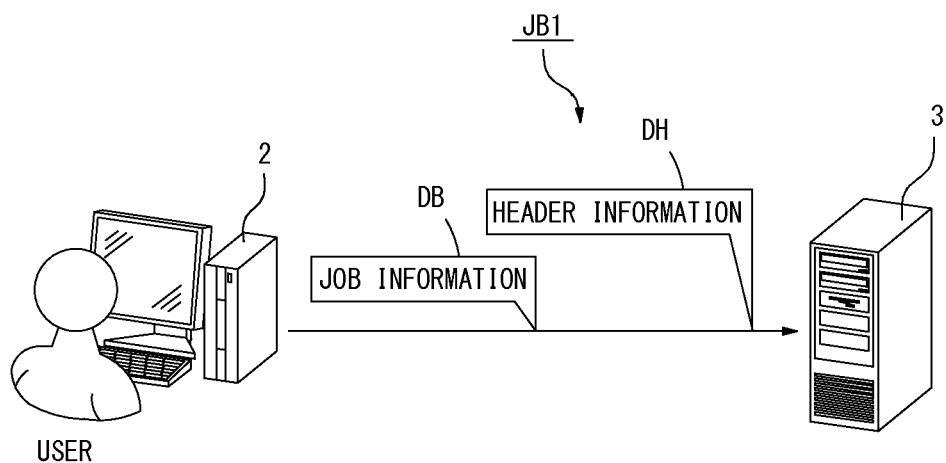

FIGS. 5A and 5B show two ways of sending the print job JB1 by the job transmitting part 32. FIG. 5A shows the way of sending the print job JB1 generated by the job generating part 31 as it is to the print server 3 by the job transmitting part 32. In this case, the job transmitting part 32 sends the header information DH in the print job JB1 to the print server 3 at first, then starting sending the job information DB after completing the transmission of the header information DH. On the other hand, FIG. 5B shows the way of sending the print job JB1 generated by the job generating part 31 by separating the header information DH and the job information DB to send by the job transmitting part 32. In this case, the job transmitting part 32 sends the header information DH separated from the print job JB1 to the print server 3 at first, then sending the job information DB separated from the same print job JB1 after completing the transmission of the header information DH. With either way, what they have in common is to send the header information DH in the print job JB1 prior to the job information DB to the print server 3. The job transmitting part 32 sends the print job JB1 with either way of FIG. 5A or 5B, hence the print server 3 is allowed to complete receipt of the header information DH before receiving the job information DB in the print job JB1.

Referring back to FIG. 3, the print server 3 includes a controller 10 and the aforementioned storage device 4. The controller 10 includes a CPU and a memory. The storage device 4 stores therein in advance the above-described rule information 6 and a program 18 installed in advance. The program 18 is executed by the CPU of the controller 10. The CPU executes the program 18, and the controller 10 serves as a job controlling part 11, a job receiving part 12, a rule determining part 13, a rule applying part 16 and a job outputting part 17.

The job controlling part 11 of the print server 3 controls overall operations of the job receiving part 12, the rule determining part 13, the rule applying part 16 and the job outputting part 17, thereby controlling execution of the print job. The job controlling part 11 monitors the network, and brings the job receiving part 12 into operation when there is the print job JB1 that should be received by the print server 3.

The job receiving part 12 receives the print job JB1 from the information processing device 2. As described above, the information processing device 2 sends the header information DH in the print job JB1 prior to the job information DB. Upon the start of receiving the print job JB1, the job receiving part 12 receives the header information DH in the print job JB1 before the job information DB. In response to starting receipt of the header information DH in the print job JB1, the job receiving part 12 brings the rule determining part 13 into operation.

The rule determining part 13 reads the rule information 6 in the storage device 4 and determines the printing rule should be applied to the print job JB1 received by the job receiving part 12. As illustrated in FIG. 3, the rule determining part 13 includes an initial determination part 14 and a main determination part 15. The initial determination part 14 is brought into operation at first and the main determination part 15 is the next.

The initial determination part 14 is brought into operation at first as the rule determining part 13 becomes operative. After the header information DH sent at first from the information processing device 2 by the job receiving part 12, the initial determination part 14 makes an initial determination to determine the printing rule should be applied to the print job JB1 only based on the header information DH thereby received. As shown in FIG. 5A, it is assumed, for example, the print job JB1 including both the header information DH and job information DB is sent as one from the information processing device 2 to the print server 3 from the header information DH. In this case, the initial determination part 14 extracts the header information DH in the information received by the job receiving part 12 based on the start information and the end information in the header information DH, thereby making the initial determination with the information contained in the header information DH. As shown in FIG. 5B, it is assumed, for example, the print job JB1 including both the header information DH and job information DB is sent from the information processing device 2 to the print server 3 from the header information DH by separating the header information DH and the job information DB. In this case, the initial determination part 14 makes the initial determination with the information contained in the header information DH after the job receiving part 12 completes receiving the header information DH.

The main determination part 15 is brought into operation after the initial determination is made by the initial determination part 14. The main determination part 15 analyzes in detail the job information DB received by the job receiving part 12 and makes the main determination to determine the printing rule to apply to the print job JB1 based on both the header information DH and the job information DB.

According to the present preferred embodiment, the initial determination part 14 becomes operative before the main determination part 15. The initial determination part 14 makes the initial determination to determine the printing rule to apply to the print job JB1 only based on the header information DH so that the result of the initial determination can be delivered promptly. The right printing rule to apply to the print job JB1 cannot be always determined only through the initial determination. It is assumed, for example, there is the printing rule like the printing rule B as shown in FIG. 2 that is applied if the number of pages of the printed output to be produced based on the print job JB1 is more than a predetermined number of pages. In this case, it cannot be determined accurately through the determination only based on the header information DH whether or not the printing rule should be applied to the print job JB1. That is because; the user may specify the print range and give the instruction to print only a part of pages. In such a case, although the header information DH contains the information as to the number of total pages of the document to print, it does not contain the information as to the number of pages to print specified by the user. In order to accurately determine whether or not the number of pages to print exceeds the predetermined number of pages, the number of pages to print needs to be counted by analyzing the image information for drawing contained in the job information DB.

The main determination part 15 of the present preferred embodiment becomes operative on the rule determining part 13 after the initial determination is performed by the initial determination part 14. As the job receiving part 12 starts receiving the job information DB after the header information DH, for example, the main determination part 15 analyzes sequentially the job information DB in parallel with the receiving operation. After receiving the job information DB and analyzing whole part of the job information DB, the main determination part 15 makes main determination to determine the printing rule to apply to the print job JB1 based on both the header information DH and the result of analysis of the job information DB. The above-described main determination allows the accurate determination appropriate for the actual pages to print contained in the job information DB. The main determination by the main determination part 15 includes the detailed analysis of the job information DB so that it takes long to produce the result of the main determination.

The initial determination part 14 sends the result of the initial determination to the information processing device 2 which is the sender of the print job JB1 soon after the result of the initial determination of the printing rule to apply to the print job JB1 is produced based on the header information DH. To be more specific, the initial determination part 14 returns the result of the initial determination to the information processing device 2 relatively quickly after the job receiving part 12 starts receiving the print job JB1. The receiving process of the print job JB1 by the job receiving part 12 may still be ongoing. Even in such a case, the initial determination part 14 is allowed to return the result of the initial determination in parallel with the receiving process of the print job JB1 by the job receiving part 12. The initial determination part 14 returns the result of the initial determination to the information processing device 2 relatively quickly, thus even if the main determination which takes long is not complete, the initial determination part 14 is capable of showing the printing rule to be applied to the print job JB1 to the user who gave the print job JB1.

In response to acquiring the result of the initial determination sent by the initial determination part 14 of the print server 3, the acquiring part 33 of the information processing device 2 brings the display processing part 34 into operation. The display processing part 34 displays the result of the initial determination on the screen of the display unit 21. Thus, the user is allowed to check the result of the initial determination of the printing rule applied to the print job JB1 relatively quickly after giving the instruction to print by viewing the displayed result. The user is allowed to give the instruction to continue or suspend the process on the print job JB1 by checking the displayed result of the initial determination. The user may select the exemption from application of the printing rule and give the instruction to continue the process for the printing rule applied to the print job JB1 and having the exemption from application 6e configured as "allow." In response to detecting the user instruction, the instruction part 35 of the information processing device 2 sends instruction information showing the instruction to continue or suspend to the print sever 3.

After completing the main determination by the main determination part 15, the main determination part 15 sends the result of the main determination to the information processing device 2 which is the sender of the print job JB1. More specifically, the main determination part 15 completes the analysis of the print job JB1 received by the job receiving part 12, and returns the result of the main determination of accurately determining the printing rule to apply to the print job JB1 to the information processing device 2. When the result of the main determination is the same as the one of the initial determination, the result of the main determination is not necessary to be sent to the information processing device 2. A part of the result of the main determination may differ from the one of the initial determination. In such a case, only the different part needs to be sent, and whole of the result of the main determination is not necessary to be sent to the information processing device 2.

In response to acquiring the result of the main determination sent by the main determination part 15 of the print server 3, the acquiring part 33 of the information processing device 2 brings the display processing part 34 into operation. The display processing part 34 updates the screen on the display unit 21 displaying the result of the initial determination based on the result of the main determination by the main determination part 15. As a result, the user is allowed to check the displayed result of the main determination of the printing rule applied to the print job JB1 and give the instruction to continue or suspend the process on the print job JB1 as well as the initial determination.

The job controlling part 11 of the print server 3 continues or suspends the process corresponding to the print job JB1 based on the instruction information in response to receiving the instruction information from the information processing device 2 after the result of the initial determination is sent to the information processing device 2 by the initial determination part 14. To be more specific, for example, when the instruction to suspend is received, the job controlling part 11 suspends the later process corresponding to the print job JB1, and discards the print job JB1. If it is during the receiving process of the print job JB1 by the job receiving part 12, the receiving operation is suspended and the print job JB1 in receipt or received print job JB1 is discarded.

When the instruction to continue is received, the job controlling part 11 continues with the process corresponding to the print job JB1 to produce the printed output based on the print job JB1. The instruction to continue may be received after the main determination, for instance. In this case, the job controlling part 11 brings the rule applying part 16 into operation to continue with the later process in response to the received user instruction to continue. The instruction to continue may be received during the main determination by the main determination part 15, for instance. In this case, the job controlling part 11 suspends the main determination, and brings the rule applying part 16 into operation to continue with the later process in response to the received user instruction to continue. If it is during the receiving process of the print job JB1 by the job receiving part 12, the receiving operation is continued and only the main determination by the main determination part 15 is suspended. As a result, the main determination which takes long may be forcibly completed halfway into process.

The rule applying part 16 applies the printing rule determined by the initial determination part 14 or the main determination part 15 to the print job JB1 in response to the user instruction to continue. To be more specific, the rule applying part 16 performs the process configured as the item of the printing rule application process 6d in the rule information 6 on the print job JB1 received by the job receiving part 12, thereby converting the print job JB1 does not meet the printing rule to the print job JB2 which meets the printing rule. The exemption from application of some of the printing rules determined by the initial determination part 14 or the main determination part 15 to apply to the print job JB1 may be configured by the user. In this case, the rule applying part 16 excludes the printing rule for which the exemption from application is configured by the user, and only applies the rest of the printing rules to the print job JB1. The print job JB2 generated by the rule applying part 16 is capable of realizing the printing process as the user intends. The rule applying part 16 outputs the print job JB2 which meets the printing rule to the job outputting part 17.

The job outputting part 17 outputs the print job JB2 converted to meet the printing rule to the image forming device 5. The job outputting part 17 outputs the print job JB2 to the address specified in the print job JB2. When the high-speed output device is designated as the address, the job outputting part 17 outputs the print job JB2 to the high-speed output device.

Concepts of data communication between each device on the above-described printing system 1 and each process performed by the device are described next.

Figure 6:
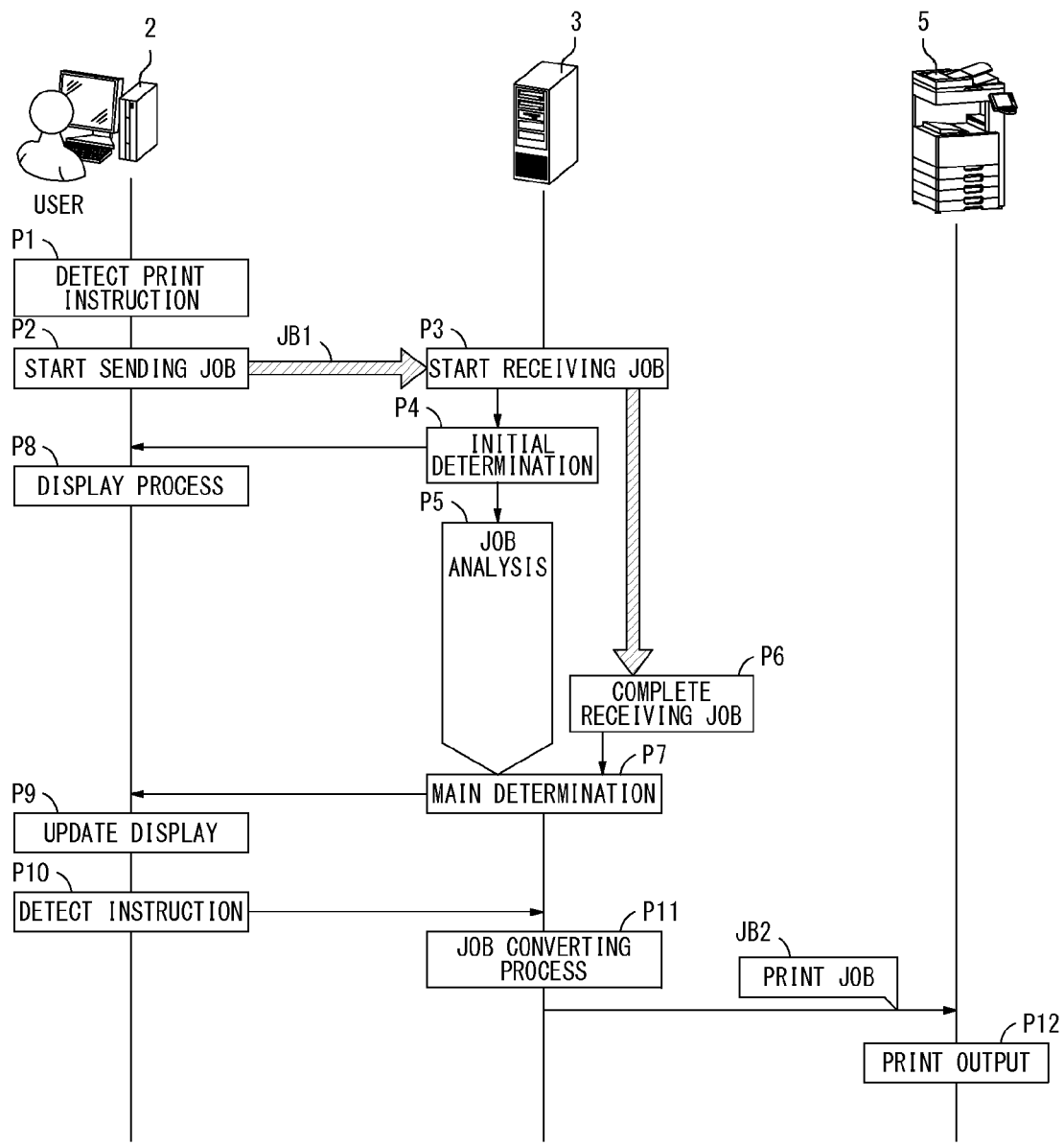
FIG. 6 is the exemplary sequence diagram of the process performed on the printing system when the printed output is produced after completing a main determination on a print server.

FIG. 6 is the exemplary sequence diagram of the process performed when the printed output is produced after completing the main determination on the print server 3. After the user instruction to print is detected on the information processing device 2 (process P1), the print job JB1 is generated and the process of sending the print job JB1 to the print server 3 is started (process P2). The time required for completing transmission of the print job JB1 depends on the volume of the information in the print job JB1, and some print jobs take more than several tens of seconds if they contain many pages, for example.

After the transmission of the print job JB1 by the information processing device 2 is started, the print server 3 starts receiving the print job JB1 (process P3). The receiving operation of the print job JB1 on the print server 3 continues through period shown with a shaded arrow in FIG. 6. The print server 3 receives the header information DH prior to the job information DB in the print job JB1 in receipt of the print job JB1. After receiving the header information DH, the print server 3 makes the initial determination in parallel with the receiving operation of the print job JB1, and sends the result of the initial determination to the information processing device 2 (process P4).

After completing the initial determination, the print server 3 starts the main determination. To be more specific, the print server 3 analyzes the job with the job information DB received after the header information DH (process P5). The job analysis is also performed in parallel with the receiving operation of the print job JB1. After the print job JB1 is received (process P6) and whole part of the job information DB in the print job JB1 is analyzed, the print server 3 makes the initial determination to determine the printing rule to apply to the print job JB1 based on the result of analysis and the header information DH (process P7). The result of the main determination may differ from the one of the initial determination. In this case, the print server 3 sends the result of the main determination to the information processing device 2. The print server 3 may only extract a part of the result of the main determination which is different from the initial determination and sends the extracted information to the information processing device 2.

Figure 7:
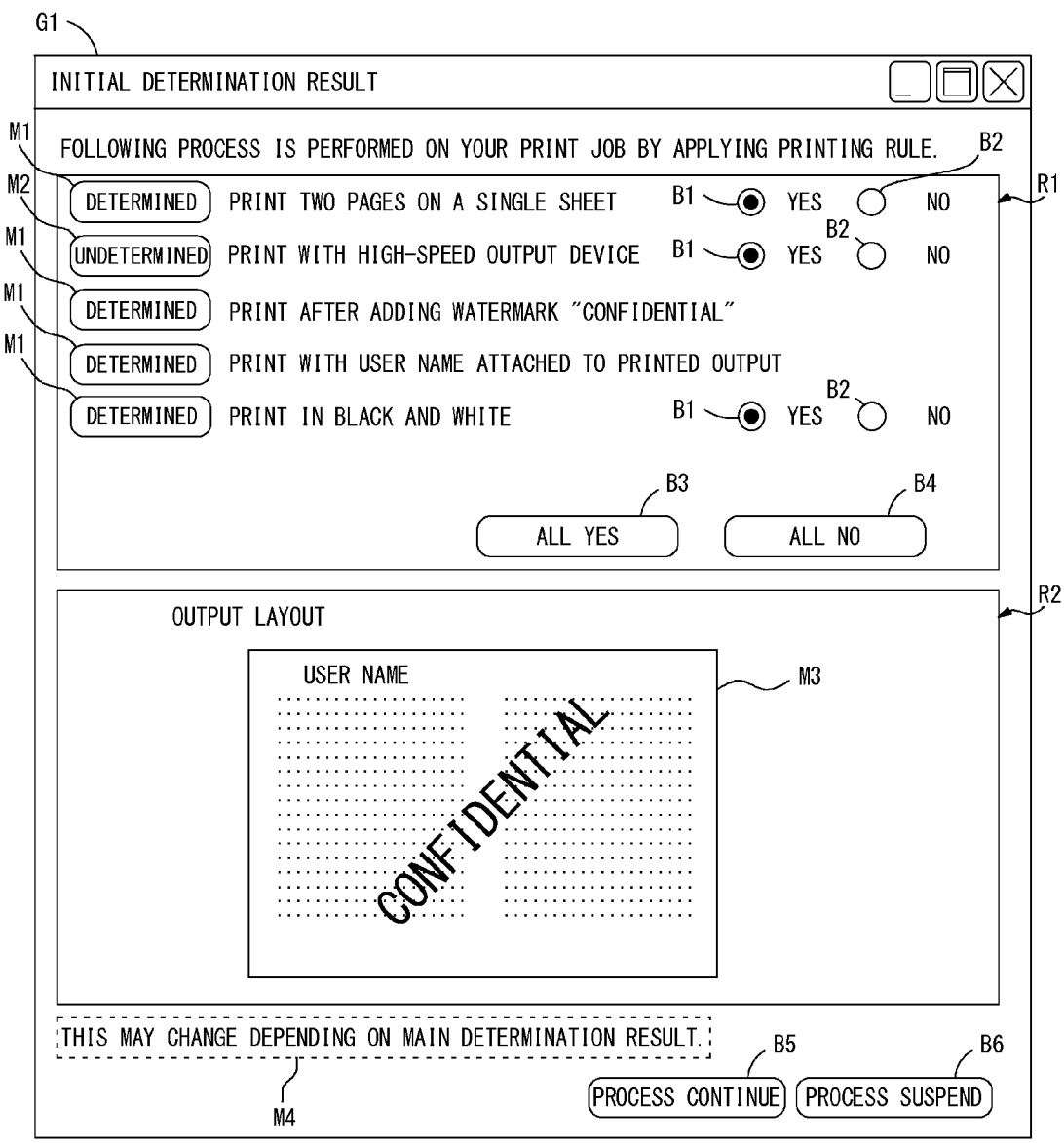
FIG. 7 is an example of an initial determination result screen displayed on the information processing device.

In response to receiving the result of the initial determination from the print server 3 after starting sending the print job JB1, the information processing device 2 displays the result of the initial determination on the display unit 21 (process P8). FIG. 7 is an example of an initial determination result screen G1 thereby displayed on the information processing device 2. The initial determination result screen G1 is shown when all of the five printing rules A, B, C, D and E registered in the rule information 6 of FIG. 2 are applied to the print job JB1. The initial determination result screen G1 is created and displayed on the display unit 21 by the display processing part 34 when the information processing device 2 receives the result of the initial determination.

The initial determination result screen G1 shown in FIG. 7 includes a rule displaying region R1 and a layout displaying region R2. The printing rule determined to be applied to the print job JB1 through the initial determination is shown in the rule displaying region R1, and the layout of the printed output to be produced when the printing rule determined through the initial determination is applied is shown in the layout displaying region R2. In the lower part of the layout displaying region R2, information M4 showing a possibility that the printing rule may change depending on the result of the later main determination because the printing rule is still not finally determined is additionally shown. By displaying the information M4, the information processing device 2 is allowed to notify the user of the possibility that the result of the initial determination may change. Also, in the lowest part of the initial determination result screen G1, a continue button B5 and a suspend button B6 are shown. The continue button B5 is pressed when the user would like to continue the process, and the suspend button B6 is pressed when the user would like to suspend the process.

In the rule displaying region R1, one or more printing rules determined to be applied to the print job JB1 through the initial determination are shown in a list form. Either of information M1 showing that the printing rule is finally determined to be applied to the print job JB1 at the point of the initial determination and information M2 showing that the printing rule is still not finally determined to be applied to the print job JB1 at the point of the initial determination is added to each printing rule displayed in a list form. In the example of FIG. 7, the information M2 showing that is still not finally determined is added to the printing rule setting "printed output is produced by high-speed output device," and the information M1 showing that is finally determined is added to rest of the printing rules. The user, therefore, is allowed to find the printing rule finally determined to be applied to the print job JB1 and the printing rule not finally determined distinctively from each other of the printing rules initially determined to be applied to the print job JB1. Two buttons B1 and B2 by pressing one of which either-or choice can be made is added to the printing rule that is set to allow the user to select the exemption from application, of the printing rules displayed in the list form. The button B1 is pressed to accept application of the printing rule, and it is selected by default at the time of display of the initial determination result screen G1. The user may want to exempt from application of the printing rule. In this case, he or she presses the button B2 separately, hence the screen changes to show that the button B2 is being selected from the button B1 being selected. As a result, the exemption from application of the printing rule may be configured. In the lower part of the rule displaying region R1, a batch approval button B3 and a batch exemption button B4 are displayed. The batch approval button B3 is pressed to collectively approve multiple printing rules which allow exemption from application by the user, and the batch exemption button B4 is pressed to collectively set exemption from application. The user presses either of the batch approval button B3 or the batch exemption button B4, thereby collectively selecting the multiple printing rules which allow the user to select the exemption from application.

A layout image M3 of the printed output to be produced when the printing rule applying process of the printing rule determined through the initial determination is performed is shown in the layout displaying region R2. When the user selects the approval or the exemption of the printing rule shown in the rule displaying region R1, the layout image M3 shown in the layout displaying region R2 is updated in real time in response to the user operation. As a result, the user is allowed to select the approval or the exemption from application of the printing rule determined through the initial determination while viewing the layout image of the printed output to be produced.

The user finally presses either the process continue button B5 or the process suspend button B6 in the lowest part of the initial determination result screen G1, thereby giving the instruction to continue or suspend the process on the print job JB1. The initial determination result screen G1 is displayed relatively rapidly after the user gives the instruction to print, so it does not waste the time until he or she is allowed to check the result of the initial determination.

Referring back to FIG. 6, in response to displaying the initial determination result screen G1 in process P8, the information processing device 2 may receive the result of the main determination without detecting the user instruction to continue or suspend. In this case, the information processing device 2 updates the screen on the display unit 21 based on the result of the main determination (process P9).

Figure 8:
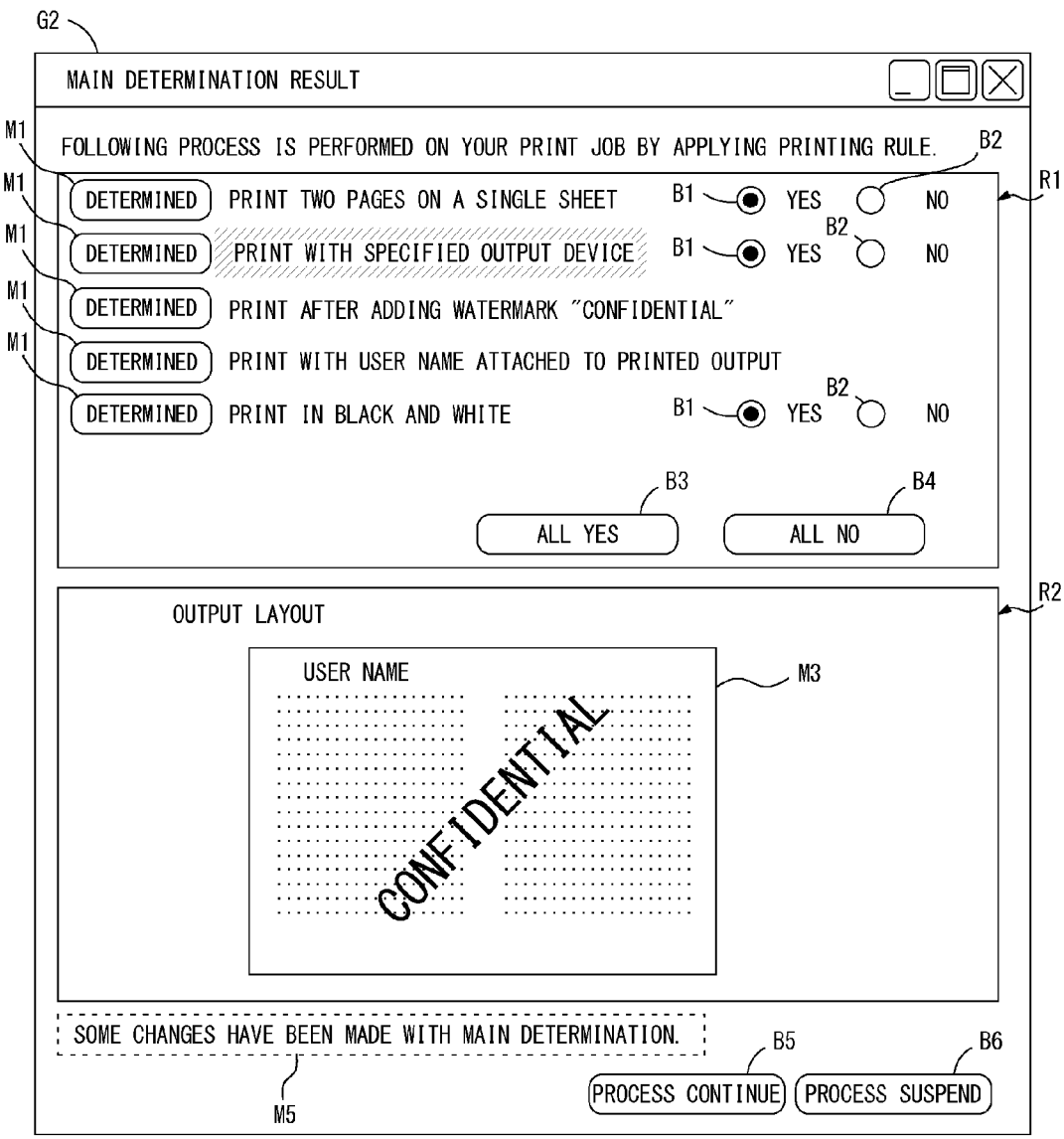
FIG. 8 is an example of a main determination result screen displayed on the information processing device.

FIG. 8 is an example of a main determination result screen G2 displayed on the information processing device 2. After the information processing device 2 receives the result of the main determination, the display processing part 34 updates the initial determination result screen G1, hence the main determination result screen G2 is displayed on the display unit 21. The main determination result screen G2 has the same screen structure as the above-described initial determination result screen G1, and it updates the result of the initial determination on the initial determination result screen G1 to the one of the main determination. In the example of FIG. 8, the printing rule setting "printed output is produced by a designated output device" in the rule displaying region R1 is displayed differently from other printing rules, and is shown that the printing rule is updated based on the result of the main determination. The information M1 showing that the printing rule is finally determined is added to the printing rule setting "printed output is produced by a designated output device", and the screen is updated from the one illustrated in FIG. 7. Moreover, information M5 showing that the information is being updated as the result of the main determination is added to the lower part of the layout displaying region R2 on the main determination result screen G2. The main determination result screen G2 is displayed on the display unit 21 so that the user is allowed to know the result of the prior initial determination is changed in response to the main determination on the print server 3 and to find that all the printing rules to be applied to the print job JB1 are finally determined.

The operation the user is allowed to make as the main determination result screen G2 being displayed is the same as that the user is allowed to make as the initial determination result screen G1 being displayed. The user is allowed to specify exemption from application of the printing rule which is allowed in advance of the printing rules to be applied to print job JB1. The user presses the continue button B5, thereby giving the instruction to continue the process on the print job JB1, and presses the suspend button B6, thereby giving the instruction to suspend the process. Moreover, the user is allowed to specify the exemption from application of a part or all of the printing rules applied to the print job JB1 and give the instruction to continue.

Again referring back to FIG. 6, after detecting the user instruction to continue or suspend while displaying the main determination result screen G2 (process P10), the information processing device 2 sends the instruction information based on the user instruction to the print server 3 (process P11). The instruction information contains either continue or suspend instruction. When the exemption from application of the printing rule is selected and the instruction to continue is given, the instruction information containing the continue instruction with the information showing the printing rule of which application is exempted attached to it to the print server 3.

In response to receiving the instruction information from the information processing device 2, the print server 3 performs the process corresponding to the received instruction information. The instruction information may contain the continue instruction, for example. In this case, the print server 3 brings the rule applying part 16 into operation and performs the job converting process (process P11). In the job converting process, the process to apply the printing rule to the print job JB1 is performed and the print job JB2 is generated. If, for example, the print settings of the print job JB1 already meet the printing rule before applying the printing rule to the print job JB1, it is not necessary to perform a new the process to apply the printing rule. The print server 3 sends the print job JB2 meeting the printing rule to the image forming device 5. After receiving the print job JB2 from the print server 3, the image forming device 5 produces the printed output based on the received print job JB2 (process P12). The image forming device 5 produces the printed output which meets the printing rule and in a way the user intends. The printed output produced by the image forming device 5 is the same as the one checked by the user in advance, hence the printed output does not go to waste.

Figure 9:
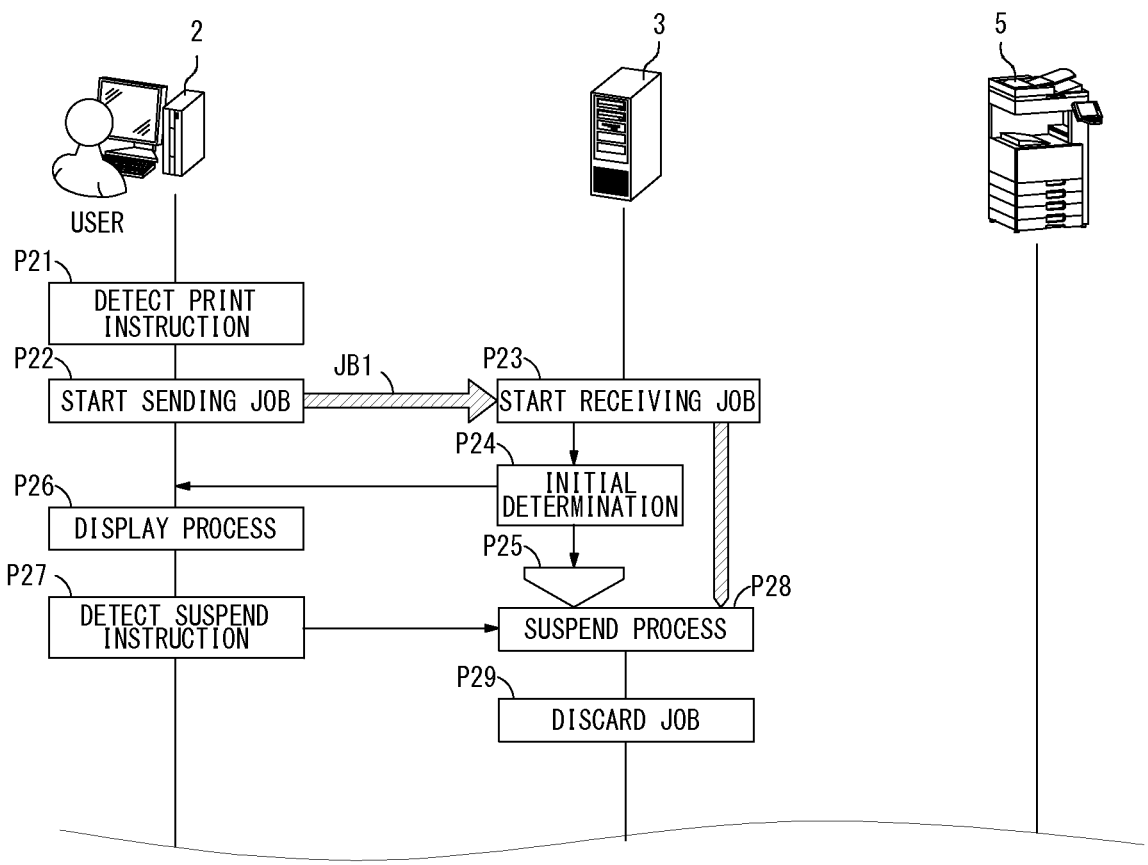
FIG. 9 is the exemplary sequence diagram of the process performed when a user gives an instruction to suspend after the initial determination on the print server.

FIG. 9 is the exemplary sequence diagram of the process performed when the user gives the instruction to suspend after the initial determination on the print server 3. After detecting the user instruction to print on the information processing device 2 (process P21), the information processing device 2 generates the print job JB1 and starts sending the generated print job JB1 to the print server 3 (process P22). When the transmission of the print job JB1 is started on the information processing device 2, the print server 3 starts receiving the print job JB1 (process P23). After completing receiving the header information DH, the print server 3 starts making the initial determination in parallel with receiving the print job JB1, and sends the result of the initial determination to the information processing device 2 (process P24). After the initial determination, the print server 3 then starts making the main determination (process P25).

After sending the print job JB1, the information processing device 2 receives the result of the initial determination from the print server 3. The information processing device 2 then displays the received result of the initial determination on the display unit 21 (process P26). The screen thereby displayed in process P26 of the information processing device 2 is the initial determination result screen G1 of FIG. 7. After detecting the user instruction to suspend while displaying the initial determination result, the information processing device 2 sends the instruction information containing the instruction to suspend to the print server 3 (process P27).

In response to receiving the instruction to suspend during the main determination or receiving process of the print job JB1, the print server 3 suspends the ongoing main determination or receiving process (process P28). The print server 3 then discards the print job JB1 received until then and completes the process (process P29). If the user gives the suspend instruction at the initial determination, the print server 3 is capable of rapidly suspending the process on the print job JB1.

Figure 10:
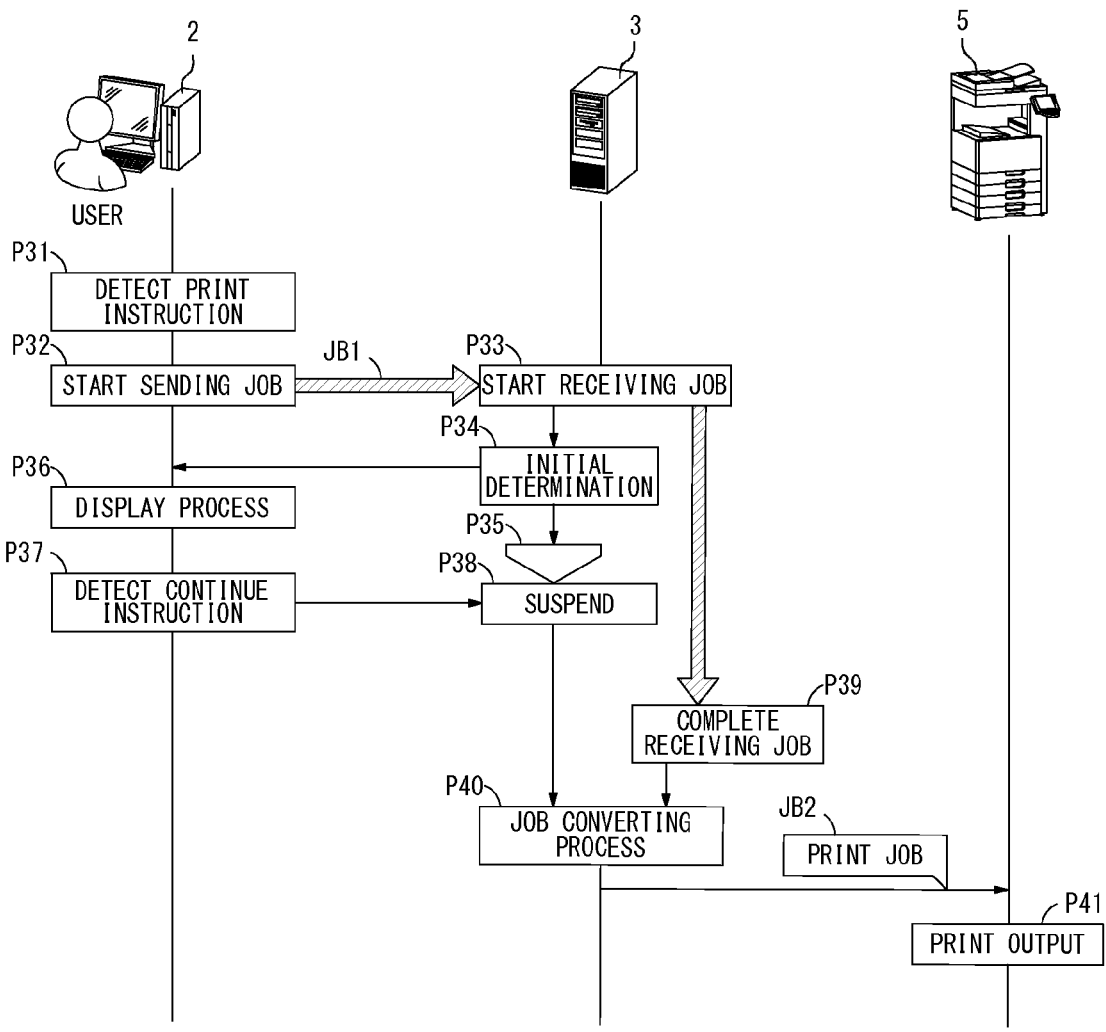
FIG. 10 is the exemplary sequence diagram of the process performed when the user gives the instruction to continue after the initial determination on the print server.

FIG. 10 is the exemplary sequence diagram of the process performed when the user gives the instruction to continue after the initial determination on the print server 3. After detecting the user instruction to print on the information processing device 2 (process P31), the information processing device 2 generates the print job JB1 and starts sending the generated print job JB1 to the print server 3 (process P32). When the transmission of the print job JB1 is started on the information processing device 2, the print server 3 starts receiving the print job JB1 (process P33). After completing receiving the header information DH, the print server 3 starts making the initial determination in parallel with receiving the print job JB1, and sends the result of the initial determination to the information processing device 2 (process P34). After the initial determination, the print server 3 then starts making the main determination (process P35).

After sending the print job JB1, the information processing device 2 receives the result of the initial determination from the print server 3. The information processing device 2 then displays the received result of the initial determination on the display unit 21 (process P36). The screen thereby displayed in process P26 is the initial determination result screen G1 of FIG. 7. After detecting the user instruction to continue while displaying the initial determination result, the information processing device 2 sends the instruction information containing the instruction to continue to the print server 3 (process P37).

In response to receiving the instruction to continue from the information processing device 2 during the main determination or receiving process of the print job JB1, the print server 3 suspends the main determination with continuing the receiving process of the print job JB1 (process P38). The print server 3 determines the printing rule to apply to the print job JB1 in response to the user instruction to continue before completing receiving process of the print job JB1. It is assumed that, for example, the user selects the exemption from application of any of the printing rules corresponding to the initial determination result. In this case, the print server 3 exempts from application of the printing rule specified by the user of the printing rules included in the result of the initial determination, and determines the rest of the printing rules as the printing rules to apply to the print job JB1. After receiving the print job JB1 (process P39), the print server 3 brings the rule applying part 16 into operation to perform the job converting process (process P40). In the job converting process, the printing rule applying process corresponding to the printing rule determined in advance is performed on the received print job JB1 and the print job JB2 meeting the printing rule is generated. If, for example, the print settings of the received print job JB1 already meet the printing rule before applying the printing rule to the print job JB1, it is not necessary to perform a new the process to apply the printing rule. The print server 3 sends the print job JB2 meeting the printing rule to the image forming device 5. After receiving the print job JB2 from the print server 3, the image forming device 5 produces the printed output based on the received print job JB2 (process P41). The image forming device 5 produces the printed output which meets the printing rule and in a way the user intends. The printed output produced by the image forming device 5 is the same as the one checked by the user in advance, hence the printed output does not go to waste. If the user gives the continue instruction at the initial determination, the print server 3 is capable of suspending the main determination which takes long halfway into process and continuing the later process on the print job JB1 based on the result of the initial determination and the user instruction, resulting in enhanced process efficiency.

FIG. 11 is a flow diagram explaining an exemplary sequential procedure of the process performed on the print server 3 realizing the above-described printing system 1. This process is performed upon the startup of the aforementioned program 18 on the controller 10 of the print server 3.

Upon start of the process, the print server 3 is put into a waiting state until start receiving the print job JB1 over the network (step S10). In response to starting receiving the print job JB1, the print server 3 starts reading the header information DH sent at first from the information processing device 2 (step S11). After reading the header information DH, the print server 3 refers to the rule information 6 (step S13), and makes the initial determination based on the read header information DH, thereby determining the printing rule to apply to the print job JB1 in receipt (step S14). After the initial determination, the print server 3 sends the initial determination result to the information processing device 2 (step S15), then starting the main determination (step S16).

The print server 3 then determines whether or not the instruction information is received from the information processing device 2 (step S17). With no received instruction information (when a result of step S17 is NO), the print server 3 determines if the receiving process of the print job JB1 is complete (step S18). When the process is complete, the print server 3 further determines whether or not the main determination is complete (step S19). If the main determination is complete, the print server 3 determines if the result of the main determination differs from the initial determination (step S20). When the result of the main determination differs from the initial determination (when a result of step S20 is YES), the print server 3 only sends the part of the main determination result different from the initial determination result to the information processing device 2 (step S21). The print server 3 returns to the process in step S17.

When the instruction information is received from the information processing device 2 in step S17, the print server 3 determines if the received instruction information contains the suspend instruction (step S22). If the suspend instruction is contained, the print server 3 suspends all the process corresponding to the print job JB1 in execution (step S23), and discards the print job JB1 received until then (step S24). If the suspend instruction is not contained in the received instruction information, the print server 3 skips the process in steps S23 and S24.

The print server 3 then determines whether or not the continue instruction is contained in the received instruction information (step S25). When the continue instruction is contained, the print server 3 determines if it is during the main determination (step S26). If it is during the main determination (when a result of step S26 is YES), the print server 3 suspends the main determination (step S27), and waits until completing the receiving process of the print job JB1 (step S28). In response to completing receiving the print job JB1, the print server 3 performs the printing rule applying process to convert the print job JB1 to the print job JB2 meeting the printing rule (step S29). The print server 3 then outputs the print job JB2 meeting the printing rule to the image forming device 5 (step S30). It may not be during the main determination at receipt of the continue instruction (when a result of step S26 is NO). In this case, the print server 3 skips the process in steps S27 and S28. When the received instruction information does not contain the continue instruction (when a result of step S25 is NO), the print server 3 skips the process in steps S26 to S30 and completes the whole process.

FIG. 12 is a flow diagram explaining an exemplary sequential procedure of the process performed on the information processing device 2 realizing the above-described printing system 1. This process is performed upon the startup of the aforementioned driver program 25 and the port monitor program 26 on the controller 20 of the information processing device 2.

The information processing device 2 waits until the user instruction to print is given (step S40). After the user instruction to print is detected, the information processing device 2 generates the print job JB1 based on the document to print specified by the user (step S41). The information processing device 2 determines whether or not to send the print job JB1 by separating the print job JB1 (step S42). For separating the print job JB1, the information processing device 2 separates the header information DH and the job information DB in the print job JB1 (step S43). The information processing device 2 starts sending the print job JB1 to the print server 3 (step S44). For separating transmission of the print job JB1, the header information DH is sent at first and the job information DB is sent after transmission of the header information DH is complete. For sending the whole print job JB1 without separation, the print job JB1 is sent sequentially from the first, so the header information DH is sent at first.

In response to starting sending the print job JB1, the information processing device 2 is put into a waiting state for the initial determination result sent from the print server 3 (step S45). After receiving the initial determination result (when a result of step S45 is YES), the information processing device 2 displays the received initial determination result on the display unit 21 (step S46). In this case, the aforementioned initial determination result screen G1 is displayed on the display unit 21.

The information processing device 2 then determines whether or not the user instruction is detected (step S47). When the user instruction is not detected (when a result of step S47 is NO), the information processing device 2 determines whether or not the transmission of the print job JB1 is complete (step S48). If the transmission is complete, the information processing device 2 determines if the main determination result is received from the print server 3 (step S49). In response to receiving the main determination result (when a result of step S49 is YES), the information processing device 2 updates the screen of the display unit 21 (step S50). As a result, the screen of the display unit 21 is updated to the main determination result screen G2 from the initial determination result screen G1. The information processing device 2 returns to the process in step S47.

When the user instruction is detected in step S47, the information processing device 2 determines if the detected user instruction is the suspend instruction (step S51). For the suspend instruction, the information processing device 2 determines if it is during the transmission of the print job JB1 (step S52). If it is during the transmission of the print job JB1, the information processing device 2 suspends the transmission of the print job JB1 (step S53). The information processing device 2 then generates the instruction information relating to the suspend instruction (step S54). If the detected user instruction is not the suspend instruction, the information processing device 2 skips the process in steps S52 to S54.

The information processing device 2 then determines if the user instruction is the continue instruction (step S55). For the continue instruction, the information processing device 2 generates the instruction information relating to the continue instruction in response to the user instruction (step S56). If the detected user instruction is not the continue instruction, the information processing device 2 skips the process in step S56.

The information processing device 2 sends the instruction information generated in step S54 or S56 to the print server 3 (step S57). The information processing device 2 then determines if it is during the transmission of the print job JB1 (step S58). If it is during the transmission, the information processing device 2 waits until completion of transmission of the print job JB1 (step S59) and completes the whole process.

As described above, on the print system 1 of the present preferred embodiment, the printing rule registered in advance with the print server 3 is applied to the print job JB1 sent from the information processing device 2 and the process defined in the printing rule is performed so that the printing process is controlled. After generating the print job JB1 in response to the user instruction, the information processing device 2 sends the header information DH in the generated print job JB1 to the print server 3 prior to the job information DB. In response to receiving the header information DH from the information processing device 2, the print server 3 makes the initial determination to determine the printing rule D1 to apply to the print job JB1 based on the header information DH, and sends the result of the initial determination to the information processing device 2. Thus, the information processing device 2 is capable of displaying the user the result of the initial determination of the printing rule applied to the print job JB1 faster than the conventional information processing devices after starting the transmission of the print job JB1. As a result, this may prevent from making the user wait for a long time.

The information processing device 2 receives the instruction relating to continuous or suspend in response to the result of the initial determination shown to the user. In response to receiving the user instruction, the information processing device 2 sends the user instruction to continue or suspend to the print server 3. After sending the result of the initial determination to the information processing device 2, the print server may receive the instruction to continue from the information processing device 2. In this case, the print server 3 continues the process on the print job JB1. When the instruction to suspend is received from the information processing device 2, the print server 3 suspends the process on the print job JB1. Thus, the user is allowed to check in advance the result of the initial determination of the printing rule applied to the print job JB1 and gives the instruction to continue or suspend the process on the print job JB1, so this may prevent the printed output from being produced in a way the user does not intend and being wasted.

After the initial determination by the initial determination part 14, the above-described print server 3 makes the main determination to determine the printing rule to apply to the print job JB1 based on both the header information DH and the job information DB in the print job JB1. It sometimes is not allowed to accurately determine the printing rule to be applied to the print job JB1 only through the initial determination. Even in this case, the later main determination allows accurate determination of the printing rule.

The instruction to continue or suspend may be received from the information processing device 2 during the main determination by the main determination part 15. In this case, the above-described print server 3 suspends the main determination by the main determination part 15. After the instruction to continue or suspend the process on the print job JB1 is given by the user based on the result of the initial determination, the process which takes long may be suspended and the process specified by the user may be started immediately on the print server 3. Especially for suspending the main determination by the main determination part 15 in response to receiving the instruction to continue from the information processing device 2, the print server 3 continues the process on the print job JB1 based on the result of the initial determination by the initial determination part 14. As a result, the later process on the print job JB1 may be proceeded rapidly, resulting in enhanced process efficiency.

The above-described print server 3 is configured to only send the different part of the result of the main determination to the information processing device 2 when the result of the main determination by the main determination part 15 differs from the result of the initial determination by the initial determination part 14. Thus, the process load on the print server 3 is reduced and the burden on the network is reduced.

As described above, for applying the printing rule and producing the printed output, the result of applying the printing rule can be displayed to the user who has given the print job promptly, and the user is not necessary to waste their time, resulting in enhanced user friendliness and operability in printing for the user.

(Modifications)

While the preferred embodiment of the present invention has been described above, the present invention is not limited to the preferred embodiment. Various modifications may be applied to the present invention.

In the present preferred embodiment described above, for example, if the user instruction to continue is given while the result of the initial determination is being displayed, the main determination is suspended on the print server 3. The main determination is not always suspended. Even when the user instruction to continue is given at the stage of the initial determination, the main determination may be continued on the print server 3. In this case, if the result of the main determination is the same as that of the initial determination, the process may be proceeded after the main determination without any change. The result of the main determination may differ from that of the initial determination. In such a case, it is determined on the print server 3 if there is a possibility of producing the printed output in a way the user does not intend and the result of the main determination may be shown to the user again based on the determination result. It is assumed, for example, the printing rule which has not been finally determined at the initial determination is finally determined through the main determination. In this case, that change has no effect on the printing process. Thus, it is not necessary to show again the result of the main determination to the user. It is assumed, for example, the printing rule which is not the one to be applied according to the result of the initial determination is added as the one to be applied according to the result of the main determination. Moreover, it is assumed, for example, the printing rule which is the one to be applied according to the result of the initial determination is removed from the one to be applied according to the result of the main determination. In such cases, those changes may have effects on the printing process. The result of the main determination may be shown to the user again.

The image forming device 5 of the above-described preferred embodiment is shown to be one of MFPs. The image forming device 5 is not necessarily the device such as the MFPs. To be more specific, the image forming device 5 should include at least printing function. The image forming device 5 may be a printer.

The print server 3 of the above-described preferred embodiment is shown to be a server, for example. The print server 3 is not necessarily the device such as the server. To be more specific, the functions on the print server 3 as described above may be included as a part of functions on other devices (for instance, the information processing device 2 or the image forming device 5).

What is claimed is:

1. A printing system comprising an information processing device and a print server, a printing rule registered in advance with said print server being applied to a print job sent from said information processing device and a process defined in the printing rule being performed so that printing process being controlled, wherein
said information processing device includes:
a job generating part for generating the print job in response to a user instruction; and
a job transmitting part for separating job information and header information showing settings of the print job generated by said job generating part and sending the separated header information to said print server, and
said print server includes:
an initial determination part for making an initial determination to determine the printing rule applied to the print job based on the header information in response to receiving the header information from said information processing device and sending a result of the initial determination to said information processing device; and
a job controlling part for continuing a process on the print job in response to receiving a continue instruction from said information processing device, and suspending the process on the print job in response to receiving a suspend instruction from said information processing device after the result of the initial determination is sent to said information processing device by said initial determination part.

2. A printing system comprising an information processing device and a print server, a printing rule registered in advance with said print server being applied to a print job sent from said information processing device and a process defined in the printing rule being performed so that printing process being controlled, wherein
said information processing device includes:
a job generating part for generating the print job containing header information and job information in response to a user instruction; and
a job transmitting part for sending the print job generated by said job generating part to said print server, and
said print server includes:
an initial determination part for extracting the header information showing settings of the print job in the print job received from said information processing device to make an initial determination to determine the printing rule applied to the print job based on the header information, and sending a result of the initial determination to said information processing device; and
a job controlling part for continuing a process on the print job in response to receiving a continue instruction from said information processing device, and suspending the process on the print job in response to receiving a suspend instruction from said information processing device after the result of the initial determination is sent to said information processing device by said initial determination part.

3. The printing system according to claim 1, wherein
said print server further includes a main determination part for making a main determination to determine the printing rule applied to the print job based on both the header information and the job information after the initial determination by said initial determination part.

4. The printing system according to claim 2, wherein
said print server further includes a main determination part for making a main determination to determine the printing rule applied to the print job based on both the header information and the job information after the initial determination by said initial determination part.

5. The printing system according to claim 3, wherein
said job controlling part suspends the main determination by said main determination part in response to receiving the continue or suspend instruction from said information processing device during the main determination by said main determination part.

6. The printing system according to claim 4, wherein
said job controlling part suspends the main determination by said main determination part in response to receiving the continue or suspend instruction from said information processing device during the main determination by said main determination part.

7. The printing system according to claim 6, wherein
for suspending the main determination by said main determination part in response to receiving the continue instruction from said information processing device, said job controlling part continues the process on the print job based on the result of the initial determination by said initial determination part.

8. The printing system according to claim 4, wherein
said main determination part sends the different result to said information processing device when the result of the main determination differs from that of the initial determination by said initial determination part.

9. The printing system according to claim 2, wherein
said information processing device further includes a display processing part for displaying the result of the initial determination on a predetermined display part in response to receiving the result of the initial determination from said print server, and
an instruction part for receiving the continue or suspend instruction by the user.

10. The printing system according to claim 9, wherein
for displaying the result of the initial determination on said display part, said display processing part of said information processing device adds and displays information showing that the printing rule to be applied to the print job is not finally determined.

11. The printing system according to claim 9, wherein
for displaying the result of the initial determination on said display part, said display processing part of said information processing device adds and displays information distinguishing the printing rule which is finally determined to be applied to the print job through the initial determination and the printing rule which is not finally determined to be applied to the print job through the initial determination.

12. The printing system according to claim 2, wherein
the header information contains at least one of user information for identifying the user, document information relating to a document to print and print setting information relating to print settings specified by the user.

13. The printing system according to claim 2, wherein
the printing rules includes multiple kinds of printing rules, and said initial determination part initially determines each kind of the printing rule to be applied to the print job.

14. The printing system according to claim 4, wherein
said information processing device further includes a display processing part for displaying the result of the initial determination on a predetermined display part in response to receiving the result of the initial determination from said print server; and an instruction part for receiving the continue or suspend instruction by the user, and said display processing part displays the printing rule corresponding to the different result in a way different from other printing rules when the result of the main determination by said main determination part differs from the result of the initial determination by said initial determination part.

15. A print server capable of controlling printing process by applying a printing rule to a print job containing header information and job information and performing process defined in the printing rule, comprising:

a receiving part for receiving the print job;

an initial determination part for making an initial determination to determine the printing rule applied to the print job based on the header information showing settings of the print job received by said receiving part and sending a result of the initial determination to a sender of the print job; and a job controlling part for continuing a process on the print job in response to receiving a continue instruction from said sender, and suspending the process on the print job in response to receiving a suspend instruction from said sender after the result of the initial determination is sent to said sender by said initial determination part.

16. The print server according to claim 15, wherein said print server further includes a main determination part for making a main determination to determine the printing rule applied to the print job based on both the header information and the job information contained in the print job after the initial determination by said initial determination part.

17. The print server according to claim 16, wherein said job controlling part suspends the main determination by said main determination part in response to receiving the continue or suspend instruction from said sender during the main determination by said main determination part.

18. An information processing device sending a print job to a print server capable of controlling printing process by applying a printing rule to the print job, comprising:

a job generating part for generating the print job containing header information and job information in response to a user instruction;

a job transmission part for sending the print job generated by said job generating part to said print server;

an acquiring part for acquiring from said print server a result of an initial determination through which the printing rule applied to the print job being determined after the process to send the print job is started by said job transmission part;

a display part on which the result of the initial determination acquired by said acquiring part is displayed; and an instruction part for sending a continue or suspend instruction in response to the result of the initial determination displayed on said display part to said print server based on the user instruction.

19. The information processing device according to claim 18, wherein said job transmission part separates the print job generated by said job generating part into the header information and the job information and sends the header information prior to the job information to said print server.

* * * * *